June 26, 1956
H. P. KALMUS ET AL
2,752,435
COMMUTATOR SWITCH FOR USE IN FLOW MEASUREMENT APPARATUS
Original Filed Dec. 30, 1952
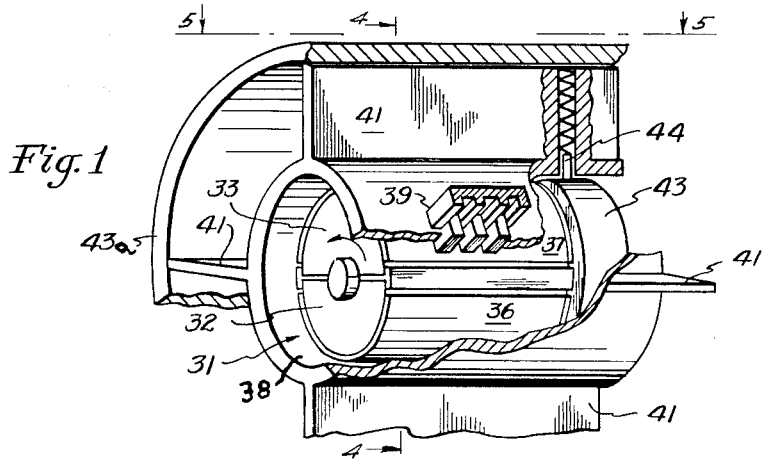
Fig. 1
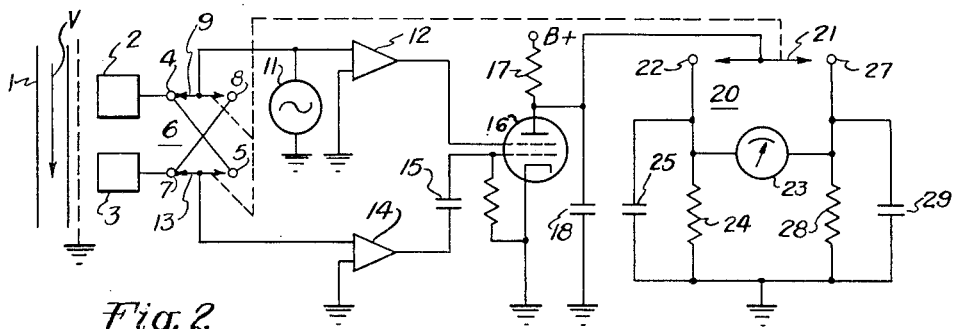
Fig. 2
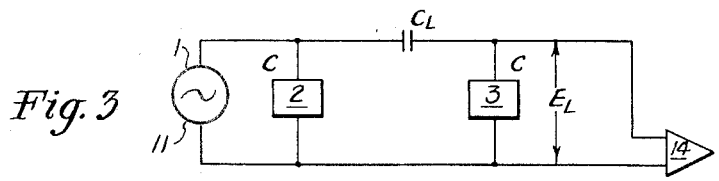
Fig. 3
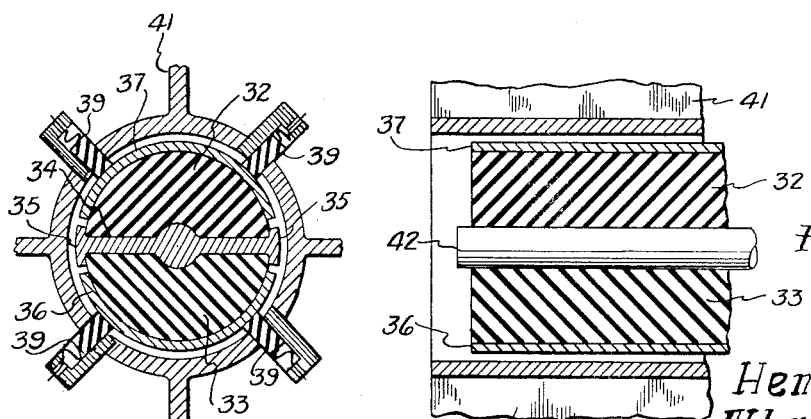
Fig. 4
Fig. 5
INVENTORS
Henry P. Kalmus
Albert L. Hedrich
BY Arthur Vinograd
ATTORNEY
Leonard F. Stoll
AGENT

United States Patent Office 2,752,435
Patented June 26, 1956

2,752,435
COMMUTATOR SWITCH FOR USE IN FLOW MEASUREMENT APPARATUS

Henry P. Kalmus, Washington, D. C., and Albert L. Hedrich, Silver Spring, Md., assignors to the United States of America as represented by the Secretary of Commerce Original application December 30, 1952, Serial No. 328,543, now Patent No. 2,724,269, dated November 22, 1955. Divided and this application May 23, 1955, Serial No. 510,588

2 Claims. (Cl. 200—26)

The present invention relates to a method and apparatus for measuring the rate of flow of a medium by means of a sound wave that is transmitted over a fixed distance between a transmitter and a receiver, and in particular to a system of the type described in which the transmitter and receiver are interchanged periodically without varying their locations.

The present invention is a division of application Serial No. 328,543, filed December 30, 1952, now Patent No. 2,724,269, issued on November 22, 1955, entitled "Method and Apparatus for Measuring Flow" in the name of Henry P. Kalmus.

As described in the referred-to copending application, means are provided for measuring the rate of flow of a fluid medium by sending a sound wave between two transducers mounted in spaced relation with respect to the direction of fluid flow in alternate directions and measuring the difference between the time of travel of the sound waves in each direction. Such system employs a synchronous rectifier in connection with the sound wave detection mechanism in order to manifest the time of wave travel as a phase shift. In order to effect a practicable synchronous rectification system, it has been found necessary to devise a special signal switching device for actuating the rectifier which has characteristic low leakage capacity and which substantially eliminates fringe effects and the effects of ground currents.

It is therefore an immediate object of this invention to provide an improved signal switching device for use in a synchronous rectifier which provides for an extremely low value of capacitive coupling between switch contacts.

Another object of this invention is to provide an improved signal switching device which is capable of relatively high-speed operation.

Other uses and advantages of the invention will become apparent upon reference to the specification and drawings, in which Fig. 1 is a perspective drawing, with cut-away portions, of a preferred embodiment of the switching mechanism, Fig. 2 is a circuit diagram of the flow-measuring system described in the referred-to copending application, Fig. 3 is an equivalent circuit diagram of the switching arrangement employed, Fig. 4 is a sectional view of the switching mechanism taken on line 4—4 of Fig. 1, and Fig. 5 is a further sectional view of the switch taken on line 5—5 of Fig. 1.

Referring to Fig. 2, there is shown a system according to the present invention in which 1 represents a conduit through which the medium flows with a velocity v. Two transducers in the form of piezoelectric crystals 2 and 3 are pressed against the conduit so that sound may be transmitted from the one crystal to the fluid medium and through the fluid medium into the other crystal. In this description it is assumed that the conduit is sound dead; that is, the walls of the conduit will not transmit sound. The output of the crystal 2 is connected to the contacts 4 and 5 of a switch 6. The output of crystal 3 is connected to the contacts 7 and 8 of the switch 6. A moving contact 9 is connected to an oscillator 11 and to the input of the limiting amplifier 12. The second moving contact 13 of the switch 6 is connected directly to the input of a limiting amplifier 14. The output of the amplifier 12 is connected to the second control grid of an electronic tube 16, and the output of the amplifier 14 is connected to the first control grid of the tube 16 through a capacitor 15. The plate of the tube is connected to B+ through resistor 17. The output of the tube 16 is connected to a synchronous rectifier 20 which includes a switch 21, capacitors 25 and 29, and resistors 24 and 28. It should be noted at this point that the movable contacts 9 and 13 of the switch 6 and movable contact 19 of switch 21 are constrained to operate synchronously. The contact 22 of switch 21 is connected to one side of a meter 23, which is connected to ground through the parallel combination of resistor 24 and capacitor 25. Similarly the other contact 27 of the switch is connected to the other side of the meter 23 and to ground through resistor 28 and capacitor 29. Initially the movable contact 9 of the switch 6 is connected to the contact 5 and the movable contact 13 is connected to the contact 7. With this arrangement the oscillator 11 feeds a signal to the crystal transducer 2 which transmits a sound wave through the medium in the conduit 1 in a downstream direction, as indicated by the arrow. This sound wave is picked up by the crystal transducer 3 and is fed to the amplifier 14 through contact 7 of switch 6. The output of the oscillator 11 is fed to the amplifier 12 regardless of the position of switch 6. The outputs of the two amplifiers 12 and 14 are connected to the grids of the tube 16, which is a tube of the type that is either completely conducting or completely nonconducting. This tube can conduct only when a positive pulse appears on both grids.

The voltage output of the oscillator, after amplification and clipping, is applied to the second grid of tube 16. The voltage received at the crystal 3 after amplification and clipping in amplifier 14, is applied to the first grid of the tube 16 and current will therefore flow in the tube only where these two signals appear simultaneously on the grids of tube 16.

As fully described in the copending application, the output obtained from tube 16 is in the form of a voltage waveform having a constant amplitude and a width determined by the coincidence between the transmitted and received signals when impressed on the grids of this tube. After several cycles of transmission from transducer 2 to transducer 3, the switch 6 is reversed so that movable contact 9 is engaged with contact 8 and movable contact 13 is engaged with contact 4. The oscillator output is now fed to transducer 3 and is transmitted as a sound wave through the medium in the upstream direction to the transducer 2, which picks up the sound wave and feeds it as an electrical signal to the input of the amplifier 14. These voltage signals from the oscillator 11 and amplifier 14 are then applied to the grids of tube 16 and provision is made for utilizing the time of coincidence of such signals to indicate the rate of fluid flow.

As described in the copending application, the width of the voltage waveform obtained from tube 16 resulting from the application of a transmitted and received signal in the direction of fluid flow is greater than the width of a similar signal obtained by applying a sound wave against the direction of fluid flow. By integrating such signals in the integrating circuit 17, 18 (Fig. 2) distinct voltage signals are obtained having amplitude levels proportionate to the time of travel of the sound wave between transducers in each direction in the fluid stream and the difference in such amplification level is a measure of the phase difference between the transmitted and received signals.

If it is desired to read the voltage difference directly across a meter, the synchronous rectifier 20 may be used. The movable contact 19 of the switch 21, which is mechanically constrained to operate in synchronism with the movable contact of the switch 6, is connected to the contact 22 when a voltage $E_d$, corresponding to the described downstream conditions, is supplied to the tube 16 and is connected to the contact 27 when the voltage $E_u$, corresponding to the described upstream condition is applied to the tube 16. The switch 21 should be designed so that its active period is shorter than the active period of switch 6 so that harmful transients due to the switching function of switch 6 will have been eliminated before a voltage is applied to the synchronous rectifier. Filter circuits composed of resistor 24 and capacitor 25 and resistor 28 and capacitor 29 eliminate the alternating-current component of the voltages and apply a direct-current voltage to the two terminals of the meter 23. Since $E_u$ is applied to one side of the meter and $E_d$ is applied to the other side, the meter will indicate the difference between the two voltages, and, because of the synchronous rectification, such signals will be applied to each side of the meter in turn. The meter will therefore indicate the difference between the two voltages.

The type of switch 6, symbolically illustrated in Fig. 1, is not suitable for use with this invention. This can readily be seen when it is realized that a voltage of approximately 100 volts is applied to the crystal 2 while the crystal 3, when used as a receiver, receives a voltage of approximately 200 microvolts. The capacitive coupling from the contact 4 to movable contact 13 is sufficient in an ordinary type of switch to completely obscure the voltage output of the crystal 3. Therefore great caution must be exercised in providing a switch in which the capacitive coupling is very small.

In Fig. 3 the effect of capacitive leakage between the switch contacts is shown. It is assumed that the oscillator 11 has zero impedance and that the amplifier 14 has infinite input impedance. Let the capacities of the crystal transducers 2 and 3 be $C$ and the leakage capacity between the switch contacts be represented as $C_L$. A voltage $E_o$ is impressed on crystal 2 and a desired voltage $E_s$ is produced by crystal 3. The leakage voltage $E_L$ across the transducer 3 should be no greater than $E_s/20$ (that is, 10 microvolts) so that phase errors are avoided for very low flow rates. The value of the voltage $E_L$ can be expressed as:

$$E_L = E_o \frac{C_L}{C_L + C} \doteq E_o \frac{C_L}{C}$$

$$C_L = \frac{E_L}{E_o} \cdot C = \frac{E_s}{20 E_o} C$$

for $C = 500$ μμf.
$E_s = 200$ μv.
$E_o = 100$ v.
$C_L = 5.10^{-5}$ μμf.

The low value of $C_L$, which must be maintained for satisfactory operation, makes a very careful design of the commutator necessary in order to eliminate the fringe effects and effects of ground currents.

Fig. 1 is a perspective view, showing a cut-away portion of a practicable embodiment of the switch 6, symbolically indicated in Fig. 2, which is suitable for use with the present invention. Figs. 4 and 5 show the switch construction in greater detail. The switch comprises a rotor 31 made of two segments of insulating material 32 and 33, which are fastened to a grounded diametrically arranged conductive shield 34, which separates the rotor segments. Such shield is formed integrally with the axle 42. Two conductive sectors 36 and 37 are mounted on the surface of the insulating segments 32, 33, but out of contact with the shield 34, as shown in Fig. 4. The shield 34, as shown in Figs. 1 and 4, is brought out to the maximum diameter of the rotor and formed into a shoe 35, thereby shielding the sector 36 from sector 37. The entire rotor is encased within a casing 38 which completely encloses and shields the rotor. The clearance between the sectors 36 and 37 and the outer shield 38 is made very small so as to limit the stray capacitance between 36 and 37, around 35, to a very small amount. The capacitive features in this system are so critical that the leakage between 36 and 37, around 35, could cause large errors unless this tolerance is kept very small. Four sets of carbon brushes, only one of which 39, is shown in Fig. 1, are arranged about the outer diameter of the commutator at 90-degree intervals. The extensions 41 of the outer shield 38 are adapted to contact an outer housing 43a (a portion of which is indicated in Fig. 1) enclosing the commutator, thereby effectively shielding the sectors between the projections 41 from each other. This also helps to minimize stray capacitances between the brushes. The rotor assembly is mounted on a shaft 42 adapted to be connected to a suitable driving means. One end of the shaft, as shown in Fig. 1 carries a slip ring 43, which contacts a grounding brush 44 in order to provide effective grounding for the shield 34.

The switch 21 symbolized in Fig. 2 is generally of the same construction as illustrated in Figs. 1, 4, and 5, and may be mounted on the shaft 42 so as to provide for synchronism between the two switches 6 and 21. The commutator segments of the switch 21 should be shorter than the commutators or segments 36 and 37 of switch 6 so as to provide a shorter active period for switch 21 for reasons already set out.

The construction of the switches 6 and 21 illustrated in Figs. 1, 4, and 5, can be correlated with the symbolically shown switches in Fig. 2 in the following manner. The fixed contacts 4, 5, 7, and 8 are represented by the four sets of brushes 39 shown in Fig. 4, while the movable contactors 9 and 13 are represented in Figs. 1, 3, and 4 by the described arcuate members 32, 37 and 33, 36, respectively, which are insulated from each other as described. When such switch construction is used for the switch 20 shown in Fig. 2, only two diametrically opposed sets of the brushes 39 are employed as the fixed contacts 22, 27.

It will be apparent that the embodiments shown are only exemplary and that various modifications can be made in construction and arrangement within the scope of the invention as defined in the appended claims.

What is claimed is:

1. An electric switch comprising a rotatable member including a shaft, shielding means extending radially from said shaft and terminating in arcuate portions concentric with said shaft, arcuate sectors extending between said arcuate portions and insulated therefrom, insulating segments situated between said arcuate sectors and said shaft and said shielding means and a ring situated on said shaft remote from said shielding means and said arcuate members, an annular external shield concentric with said shaft and positioned about said arcuate segments and said ring, an outer enclosure for said switch, said external shield having a number of radially extending portions spaced at equal intervals around said external shield, said radially extending portions contacting said outer enclosure, and first brush means supported by said external shield and contacting said arcuate members, and second brush means for grounding said ring to said external shield, said shaft being rotatably supported in said outer enclosure.

2. In an electric switch a rotatable member comprising a shaft, shielding means extending radially from said shaft and terminating in arcuate portions concentric with said shaft, arcuate segments extending between said arcuate portions and insulated therefrom, and insulating sectors situated between said arcuate segments in said shaft.

References Cited in the file of this patent

UNITED STATES PATENTS 1,532,573   Bruno _____ Apr. 7, 1925